United States Patent [19]

FitzGerald et al.

[11] Patent Number: 4,468,060
[45] Date of Patent: Aug. 28, 1984

[54] AERODYNAMIC ENCLOSURE WITH A CONDENSER INLET COVER

[76] Inventors: Joseph M. FitzGerald, 8690 Los Coyotes Dr., Buena Park, Calif. 90621; James P. FitzGerald, 1845 Island Dr., Fullerton, Calif. 92633

[21] Appl. No.: 427,780
[22] Filed: Sep. 29, 1982
[51] Int. Cl.³ ............................................. B62D 35/00
[52] U.S. Cl. ...................................... 296/1 S; 62/239
[58] Field of Search ........................... 296/1 S; 62/239

[56] References Cited

U.S. PATENT DOCUMENTS 4,078,395 3/1978 Crowe et al. ........................ 296/1 S
4,310,192 1/1982 FitzGerald ........................... 296/1 S Primary Examiner—Robert R. Song
Attorney, Agent, or Firm—Gordon L. Peterson

[57] ABSTRACT

An apparatus for reducing the aerodynamic drag of a refrigerated cargo carrying vehicle of the type having a front wall and a refrigeration unit on the front wall. The apparatus comprises a wind deflector configured to reduce the aerodynamic drag of the vehicle. The wind deflector has a forward wall with an opening which confronts a condenser of the refrigeration unit. A door is mounted on the forward wall for movement to open and close the opening.

8 Claims, 6 Drawing Figures

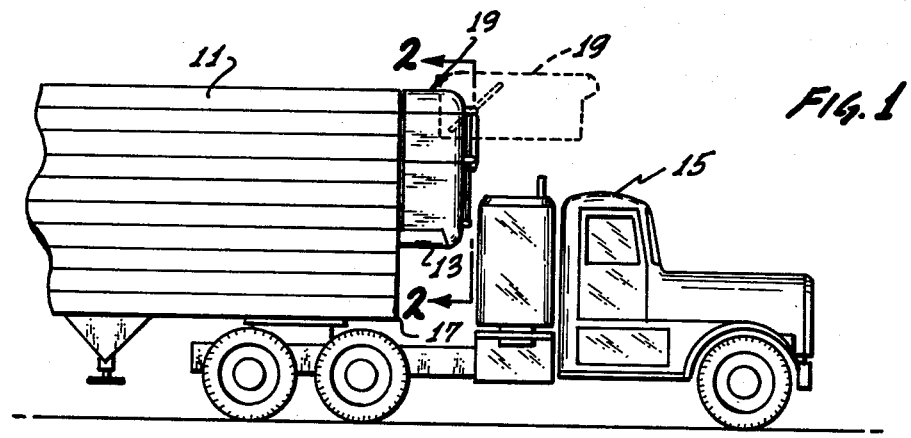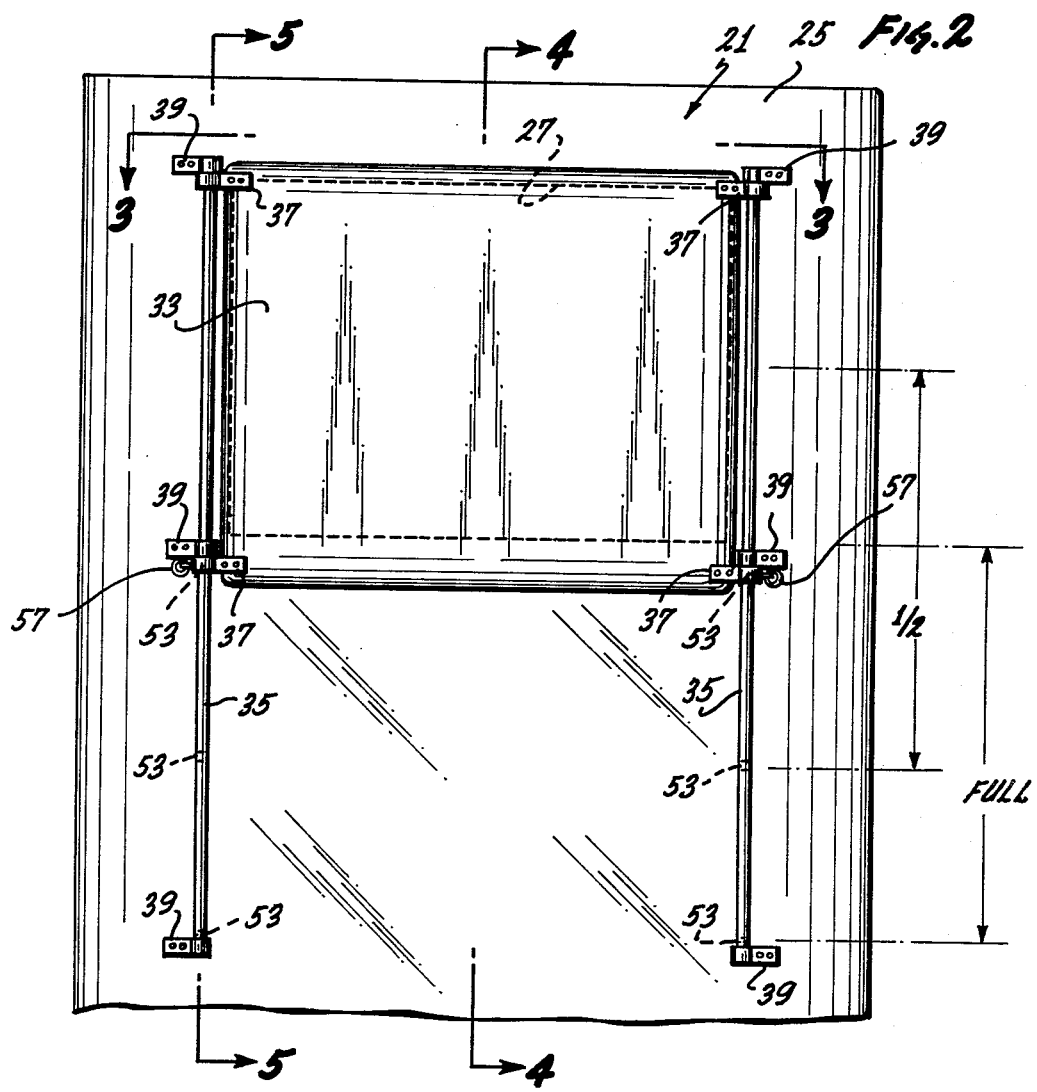

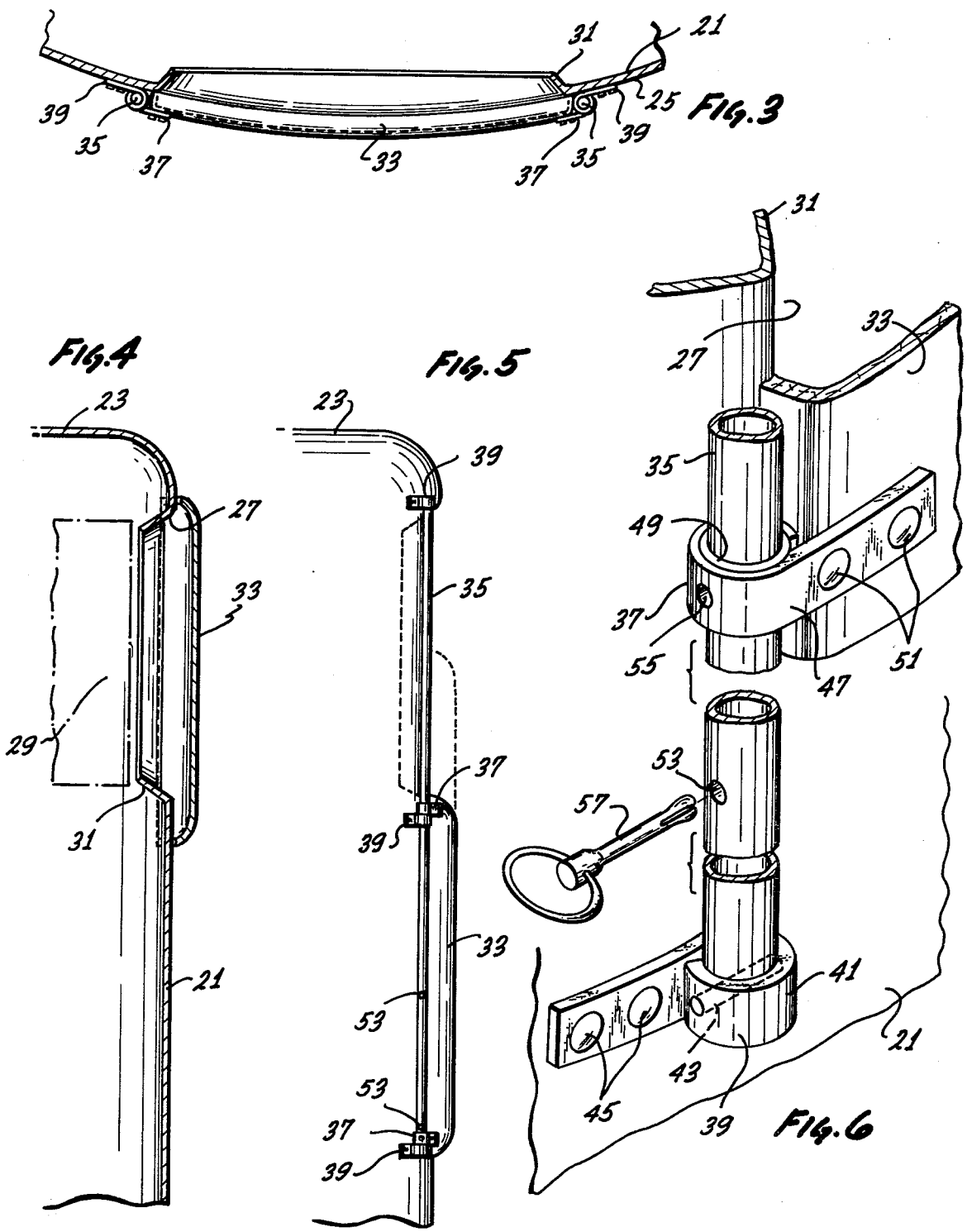

AERODYNAMIC ENCLOSURE WITH A CONDENSER INLET COVER

BACKGROUND OF THE INVENTION

Refrigerated cargo carrying vehicles are commonly used to transport goods which must be maintained at less than ambient temperatures. For example, a refrigerated trailer pulled by a tractor is commonly used for this purpose.

The interior of a refrigerated trailer is commonly cooled by a refrigeration unit carried on the wall of the trailer. The refrigeration unit comprises various components, including a condenser, and the refrigeration unit is commonly housed within a metal enclosure which only partially encloses the unit. The enclosure is provided with an opening to receive outside air to cool the condenser.

The term "refrigeration unit" as used herein means the commonly used unit which provides cooling or heating to the interior of the cargo carrying vehicle. For example, when the trailer is used to haul certain goods in freezing temperatures, the refrigeration unit is employed as a heating unit. In this connection, it is known to utilize pivotal metal shutters for closing or partly closing the opening to improve the heating capacity of the refrigeration unit.

The metal enclosure described above is not aerodynamically configured, and thus it does not reduce the aerodynamic drag of the vehicle. It is known, however, to employ a wind deflector over the refrigeration unit to reduce the aerodynamic drag of the vehicle, and such an apparatus is disclosed in FitzGerald U.S. Pat. No. 4,310,192. The wind deflector of the FitzGerald patent has an opening confronting the condenser for supplying air to the refrigeration unit.

Although the aerodynamic wind deflector of the FitzGerald patent materially reduces the drag of the vehicle, it has been found that the air intake opening confronting the condenser inhibits the drag-reducing function of the wind deflector. The opening has also been found to be undesirable for other reasons in that it promotes noise pollution from the refrigeration unit, adversely affects stability of the trailer, and readily admits insects and debris to the refrigeration unit.

SUMMARY OF THE INVENTION

This invention overcomes the problems and disadvantages of the prior art in providing a closure member for varying the degree to which the air intake opening is left open. With this invention, the opening can be completely closed when the vehicle is running and no refrigeration required. This materially improves the drag reducing ability of the aerodynamic enclosure and promotes fuel economy. In addition, enclosing the refrigeration unit with the wind deflector and closing the opening of the wind deflector increases the heating capacity of the refrigeration unit. Of course, with the opening closed, insects, debris, and other elements can not come into contact with the refrigeration unit. Closing of the opening reduces the noise from the refrigeration unit, and if the wind deflector is of the pivotal type as described in the FitzGerald patent, closing of the opening when the wind deflector is raised enables the wind deflector to provide more complete protection from the sun and weather for those working on the refrigeration unit.

The closure can fully open the opening. This may be necessary when the refrigeration unit is operating in reasonably warm ambient temperatures.

Preferably, the closure member can partially close the opening. The partially closed position is used when the refrigeration unit requires some ambient air. In this event, the advantages enumerated above are partially obtained.

The closure member preferably includes a door which moves generally parallel to the forward wall of the wind deflector. The door is preferably curved and has a convex outer surface to enhance the drag reducing function of the wind deflector. The door can comprise one or more sections and be movable horizontally or vertically.

Because the door may be opened or partially opened when the vehicle is running, it preferably translates rather than pivots between its positions. A pivotable door in the open or partially open position would tend to produce aerodynamic drag. According to a preferred construction, the door is mounted on bearings which are in turn slidably mounted on one or more guide rods carried by the wind deflector. The door can be retained in any one of a plurality of positions.

The door can be used in conjunction with aerodynamic and nonaerodynamic enclosures for refrigeration units. It may be used with such enclosures whether or not they are pivotable as described in FitzGerald Pat. No. 4,310,192.

The invention, together with addditional features and advantages thereof may best be understood by reference to the following description taken in connection with the accompanying illustrative drawing.

BRIEF DESCRIPTION OF THE DRAWING

FIG. 1 is a side elevational view of a tractor and refrigerated trailer with a wind deflector mounted on the refrigeration unit and a door mounted on the wind deflector.

FIG. 2 is a front elevational view along lines 2—2 of FIG. 1 and shows the door in the closed position.

FIG. 3 is a fragmentary sectional view along lines 3—3 of FIG. 2 and shows the contour of the door in relation to the contour of the air deflector.

FIGS. 4 and 5 are fragmentary sectional views taken generally along lines 4—4 and 5—5 of FIG. 2, respectively, illustrating the door in the closed and open positions. In FIG. 5, the door is shown in a partially closed position in phantom lines.

Fig. 6 is a fragmentary, partially exploded view partially in section showing one way of mounting the door for movement on the wind deflector.

DETAILED DESCRIPTION OF THE PREFERRED EMBODIMENT

FIG. 1 shows a trailer 11, a refrigeration unit 13 for cooling the interior of the trailer 11 and a tractor 15 for pulling the trailer. The trailer 11 and the tractor 15 are typical of cargo carrying vehicles of the type with which this invention may be used. The trailer 11 has a front wall 17, and the refrigeration unit 13 is mounted on the front wall 17 in a conventional manner.

A wind deflector 19 is mounted on the refrigeration unit 13 as shown and described in FitzGerald Pat. No. 4,310,192, the disclosure of which is incorporated by reference herein. This invention can be embodied in various different enclosures for refrigeration units, and the illustration and description of the wind deflector 19 is purely illustrative. The wind deflector 19 forms an aerodynamic enclosure for the refrigeration unit 13 which reduces the aerodynamic drag of the trailer 11 and may be identical to the wind deflector of the Fitz-Gerald patent except as may be shown or described herein.

The wind deflector 19 includes a curved forward wall 21 of fiberglass, plastic, or other suitable material and a short upper wall or flange 23 (FIG. 4). The bottom of the wind deflector 19 may be closed, partially closed or open as desired.

The forward wall 21 has an outer surface 25 which is curved convexly as best seen in FIG. 3 in a manner to create an aerodynamic surface for passing through the air with a minimum of drag.

An air inlet opening 27 of generally rectangular configuration is provided in the forward wall 21 in alignment with the condenser 29 of the refrigeration unit 13. The condenser 29 is shown schematically in FIG. 4. A flange 31 formed integrally with the forward wall 21 extends around the rim of the opening 27 to strengthen the forward wall in this region.

A closure member in the form of a door 33 is mounted for vertical movement over the opening 27 by mounting means which includes spaced, parallel, vertical guide rods 35 and four identical bearings 37. In the illustrated embodiment, the guide rods are mounted at their upper ends, lower ends, and intermediate their upper and lower ends on the forward wall 21 by identical mounting assemblies 39. As shown in FIG. 6, each of the mounting assemblies 39 may include a collar bracket 41 attached to the associated guide rod 35 by a pin 43 and having an ear attached to the forward wall 21 by fasteners such as screws 45.

As shown in FIG. 6, each of the bearings 37 may comprise a collar bracket 47, a sleeve bearing 49 suitably retained in the collar bracket 47 and slidably receiving the associated guide rod 35, and screws or other suitable fasteners 51 for attaching the collar bracket 47 to the door 33.

With this construction, the door 33 can be manually moved up and down along the guide rods 35 to any of a plurality of different positions, including the fully closed position of FIG. 2 and the fully open position of FIG. 5. In order to retain the door 33 in a selected position, each of the guide rods 35 is provided with a plurality of radial bores 53 (FIGS. 2 and 6) spaced axially along their lengths. In addition, each of the lower bearings 37 has a radial bore 55 which extends through one side of the sleeve bearing 49 and the adjacent region of the collar bracket 47. Accordingly, the door 33 can be retained in a particular position along the guide rods 35 by moving the door until the bore 55 is aligned with an associated bore 53 and inserting a pin 57 (FIGS. 2 and 6) through the aligned bores. In the embodiment illustrated, an upper, intermediate, and lower set of the bores 53 are provided to establish fully closed, partially closed, and fully open positions of the door 33. Of course, any number of positions may be established by providing additional sets of bores 53.

Although the door 33 is moved manually in the illustrated embodiment of the invention, it could, if desired, be moved with an appropriate motor or actuator.

Although an exemplary embodiment of the invention has been shown and described, many changes, modifications and substitutions may be made by one having ordinary skill in the art without necessarily departing from the spirit and scope of this invention.

We claim:
1. An apparatus for reducing the aerodynamic drag of a refrigerated cargo carrying vehicle of the type having a front wall and a refrigeration unit on the front wall, said refrigeration unit having a condenser, said apparatus comprising:
a wind deflector for at least partially enclosing the refrigeration unit and the condenser and configured to reduce the aerodynamic drag of the vehicle;
said wind deflector having a forward wall, said forward wall having an air intake opening therein for the passage of air to the refrigeration unit, said opening being adapted to confront the condenser of said refrigeration unit when the wind deflector is mounted on the vehicle to reduce the aerodynamic drag of the vehicle;
a closure member;
means for mounting said closure member on the wind deflector for movement between first and second positions, said closure member closing more of said opening in said first position than in said second position;
said closure member comprsing a door and said mounting means mounts the door for sliding movement between said first and second positions; and
said mounting means including at least one guide rod mounted on the wind deflector and extending generally along one side of said opening and bearing means for mounting the door on said guide rod for movement between said first and second positions.

2. The apparatus of claim 1 wherein the mounting means mounts the closure member for movement generally parallel to the forward wall.

3. The apparatus of claim 1 wherein said forward wall and said closure member are of a curved configuration.

4. The apparatus of claim 1 wherein the closure member substantially closes said air intake opening in said first position.

5. The apparatus of claim 1 including means for retaining said door in said first and second positions.

6. The apparatus of claims 5 wherein said door and said front wall are curved and have convex outer surface portions.

7. The apparatus of claim 1 including a flange on the front wall adjacent the opening.

8. An apparatus for use with a refrigerated cargo carrying vehicle of the type having a front wall and a refrigeration unit on the front wall, said refrigeration unit having a condenser, said apparatus comprising:
an enclosure for at least partially enclosing the refrigeration unit and the condenser;
said enclosure having a forward wall, said forward wall having an air intake opening therein for the passage of air to the refrigeration unit, said opening adapted to confront the condenser of the refrigeration unit when the enclosure is mounted on the vehicle;
a door;
means for mounting said door on the wind deflector for translation between first and second positions, said door closing more of said opening in said first position than in said second position; and
said mounting means including at least one guide rod mounted on the enclosure and extending generally along one side of said opening and bearing means for mounting the door on said guide rod for movement between said first and second positions.

* * * * *